(12) United States Patent
Jeschke et al.

(10) Patent No.: US 12,474,174 B2
(45) Date of Patent: Nov. 18, 2025

(54) SYSTEM AND METHOD FOR GIG DRIVING DETECTION

(71) Applicant: ALLSTATE INSURANCE COMPANY, Northbrook, IL (US)

(72) Inventors: Clayton Jeschke, Algonquin, IL (US); Mariela Perignon, Chicago, IL (US); Nicholas Winter, Chicago, IL (US); Dipti Karmarkar, Hoffman Estates, IL (US); Anjana Tayi, Medford, MA (US)

(73) Assignee: Allstate Insurance Company, Northbrook, IL (US)

( * ) Notice: Subject to any disclaimer, the term of this patent is extended or adjusted under 35 U.S.C. 154(b) by 180 days.

(21) Appl. No.: 17/884,834

(22) Filed: Aug. 10, 2022

(65) Prior Publication Data
US 2024/0053156 A1    Feb. 15, 2024

(51) Int. Cl.
*G01C 21/34* (2006.01)

(52) U.S. Cl.
CPC ....... *G01C 21/343* (2013.01); *G01C 21/3492* (2013.01)

(58) Field of Classification Search
CPC ... G01C 21/343; G01C 21/3492; G06N 20/00
USPC .......................................................... 701/23
See application file for complete search history.

(56) References Cited

U.S. PATENT DOCUMENTS

| | | | | |
|---|---|---|---|---|
| 8,558,678 B2* | 10/2013 | Van Wiemeersch | .... | B60R 25/00 340/439 |
| 9,292,982 B1* | 3/2016 | Higgs | .................... | G06Q 10/06 |
| 9,995,584 B1* | 6/2018 | Kanevsky | ................ | G07C 5/08 |
| 10,676,097 B1* | 6/2020 | Goldfarb | ................ | G06V 20/59 |
| 11,377,111 B1* | 7/2022 | Guziec | .................. | G01G 19/086 |
| 11,663,675 B1* | 5/2023 | Estes | ............... | G06Q 10/06398 705/4 |
| 2016/0066155 A1* | 3/2016 | Fan | ........................ | G06F 3/0484 455/457 |
| 2021/0123749 A1* | 4/2021 | Kreig | .................... | H04W 4/021 |
| 2021/0221384 A1* | 7/2021 | Musuluri | ........... | G01C 21/3617 |
| 2022/0024414 A1* | 1/2022 | Isaac | ........................ | G06V 40/50 |
| 2022/0269678 A1* | 8/2022 | Li | ........................ | G06F 16/3322 |
| 2022/0270177 A1* | 8/2022 | Chintakindi | .......... | H04W 4/029 |

(Continued)

OTHER PUBLICATIONS

Isaac Brodsky, "H3: Uber's Hexagonal Hierarchical Spatial Index",Uber Engineering, Jun. 27, 2018, https://eng.uber.com/h3/ (11 pages).

*Primary Examiner* — Andrew R Dyer
(74) *Attorney, Agent, or Firm* — Akerman LLP (57) ABSTRACT

Aspects of the present disclosure generally relate to systems and methods for data processing, and more specifically for classifying telematics data to identify gig driving associated with vehicle trips. In one implementation, a method may include the operations of segmenting a trip of a vehicle to yield multiple segments, generating, via a feature extraction component, one or more input features associated with each segment of the multiple segments based on input data indicating driving characteristics during the trip, determining, via a gig detection component, whether the trip is associated with gig driving based on the one or more input features associated with teach segment, and outputting an indication of whether the trip is associated with gig driving based on the determination.

16 Claims, 9 Drawing Sheets

(56) References Cited

U.S. PATENT DOCUMENTS

| | | | |
|---|---|---|---|
| 2023/0078143 A1* | 3/2023 | Ghanbari | G01C 21/3484 |
| | | | 701/32.1 |
| 2023/0113454 A1* | 4/2023 | Sanchez | G06Q 40/08 |
| | | | 705/4 |
| 2023/0186878 A1* | 6/2023 | Wipperfürth | G06F 3/165 |
| | | | 715/772 |
| 2023/0316349 A1* | 10/2023 | Chaturvedi | G06Q 30/04 |
| | | | 705/40 |
| 2023/0410002 A1* | 12/2023 | Yoo | G06N 20/00 |
| 2024/0005284 A1* | 1/2024 | Han | G06Q 30/06 |

* cited by examiner

SYSTEM AND METHOD FOR GIG DRIVING DETECTION

TECHNICAL FIELD

Aspects of the present disclosure generally relate to systems and methods for data processing, and more specifically, for classifying telematics data to identify gig driving associated with vehicle trips.

BACKGROUND

Telematics data from vehicles may be processed in a variety of ways to gain an understanding of the operation of the vehicles. Acceleration data, speed data, braking data, heading data, and the like obtained from a device associated with an operated vehicle may be processed to determine aspects of the vehicle operation. For example, acceleration or speed data may be used to determine how safe a driver operates the vehicle. The telematics data may be obtained from a built-in sensing device of a vehicle, or from other devices such as a mobile device of a user.

SUMMARY

Implementations described and claimed herein address the foregoing by providing systems and methods for trip classification. In one implementation, a method may include the operations of segmenting a trip of a vehicle to yield multiple segments, generating, via a feature extraction component, one or more input features associated with each segment of the multiple segments based on input data indicating driving characteristics during the trip, determining, via a gig detection component, whether the trip is associated with gig driving based on the one or more input features associated with teach segment, and outputting an indication of whether the trip is associated with gig driving based on the determination.

In one implementation, a method may include the operations of generating, via a feature extraction component, one or more input features associated with a trip of a vehicle based on input data indicating driving characteristics during the trip, determining, via a gig detection component, whether the trip is associated with gig driving based on the one or more input features, determining, via one or more gig type detection components, a type of the gig associated with the trip based on the one or more input features, the type of the gig being determined in response to determining that the trip is associated with gig driving, and outputting an indication of the type of gig based on the determination.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Certain aspects of the present disclosure are directed to methods and systems for gig driving detection. A driver may use a particular vehicle for gig driving or personal use. Examples of gig driving include package delivery, delivery on demand (e.g., on-demand food delivery from restaurants), or rideshare. For example, a transportation network company may match passengers with vehicles via websites and mobile apps for performing rideshare. Drivers for transportation network companies typically own or lease their own vehicles when driving. Accordingly, an example driver can use their vehicle for both business purposes and personal purposes. However, due to the distributed nature of transportation network companies, it is difficult to assess when a specific driver is driving for a transportation network company (e.g., or any other gig driving company) compared to personal use. Accordingly, there is a need to accurately determine if a driver is engaged in a trip for business or personal use. For instance, if a driver has rented a vehicle from a gig driving company but is using the vehicle for personal use during a particular accident, the gig driving company may not be responsible for any resultant damages.

Even once determined that a driver is engaged in a trip for business (e.g., gig driving), it may be important in some scenarios to know the type of gig driving the driver is engaged in. As one example, this information may be used to properly assess the responsibility of damages to the vehicle that may be caused due to an accident. During a particular day, a driver may perform some personal driving and different gigs for one or more different gig driving companies. For example, a driver may perform some personal driving, some delivery on demand, and some package delivery during a day. A driver may perform different types of gigs to maximize their profits throughout the day. These gigs may be performed for different platforms, and thus, it may be difficult to determine what a vehicle is being used for during any particular trip. The risk associated with driving the vehicle is partitioned differently depending on how the vehicle is used, and thus, it is important to accurately determine whether a trip is for personal use or gig driving, and more particularly, the type of gig driving.

Certain aspects of the present disclosure are directed towards a machine learning model trained to detect personal versus gig driving, and in some aspects, the type of gig driving. In some aspects, a particular trip may be partitioned into time segments (e.g., 15-minute segments). The movement trail of the vehicle (e.g., from global positioning system (GPS) data, accelerometer data, compass data, network connection data, and/or a combination of one or more types of data) during the trip may be provided to the machine learning model, and the machine learning model may output a likelihood of whether the trip is associated with personal driving, gig driving, and in some instances, the type of gig driving.

These and various other arrangements will be described more fully herein. As will be appreciated by one of skill in the art upon reading the following disclosure, various aspects described herein can be a method, a computer system, or a computer program product. Accordingly, those aspects can take the form of an entirely hardware implementation, an entirely software implementation, or at least one implementation combining software and hardware aspects. Furthermore, such aspects can take the form of a computer program product stored by one or more computer-readable storage media having computer-readable program code, or instructions, included in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Figure 1:
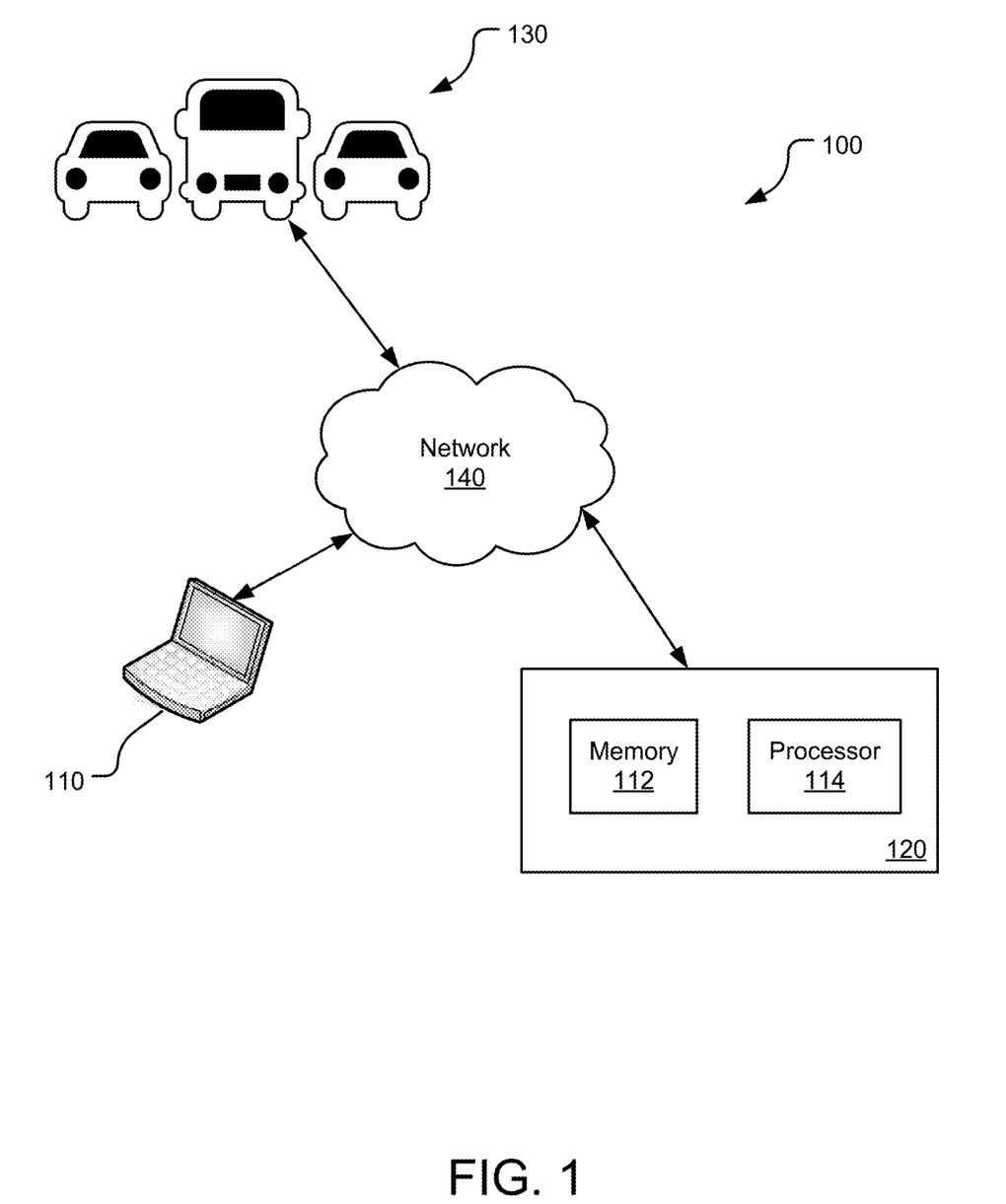
FIG. 1 illustrates an example operating environment for gig detection driving.

FIG. 1 illustrates an operating environment 100 in accordance with at least one implementation. The operating environment 100 includes at least one client device 110, at least one classification server system 120, and/or at least one vehicle 130 in communication via a network 140. Client devices 110 and classification server systems 120 can allow for users to obtain telematics data from vehicles 130, generate trips, and/or classify trips, vehicles, and the like. The network 140 can include a local area network (LAN), a wide area network (WAN), a wireless telecommunications network, and/or any other communication network or combination thereof. Any of the devices and systems described herein can be implemented, in whole or in part, using one or more computing devices described with respect to FIG. 2. For example, classification server system 120 may include one or more processors 114 and a non-transitory memory 112. Client devices 110 and/or the at least one vehicle 130 may include similar components, in addition to other components described below.

Vehicle 130 can be, for example, an automobile, motorcycle, scooter, bus, recreational vehicle, boat, or other vehicle for which sensor or crash data can be collected and analyzed. A telematics device within the vehicle 130 can be used to collect and/or receive sensor data and/or to receive sensor data from the vehicle 130. A telematics device can be, for example, mobile phones, personal digital assistants (PDAs), tablet computers, laptop computers, smartwatches, and other devices that can be carried by drivers or passengers inside or outside of the vehicle 130. The telematics device can also be integrated into the vehicle 130 and/or connected to a data bus within the vehicle 130 via a diagnostic connector, such as an OBD-II connector. The telematics device can receive a variety of data, such as acceleration, velocity, location, vehicle operation data such as braking, turning, swerving, and the like from sensors located within the telematics device and/or vehicle. For example, a telematics device having a Global Positioning System (GPS) receiver can determine vehicle location, speed, direction, and other basic driving data without needing to communicate with vehicle sensors or external vehicle systems. However, it should be noted that any of a variety of other location determination techniques, such as location determined based on wireless networks to which the mobile device is connected, such as Wi-Fi networks, cellular networks, and the like, can also be used. The sensors of the telematics device, such as a GPS and/or a compass, can sense the speed and/or direction at which the telematics device (and accordingly vehicle 130) is traveling. An accelerometer of the telematics device can sense the acceleration of the mobile device. A gyroscope can be used to determine the orientation of the mobile device. In some aspects, orientation can be detected, for example, at a rate of 90 Hz. The gyroscope can also be used to measure the speed of rotation of the telematics device. A magnetometer can be used to measure the strength and direction of the magnetic field relative to the telematics device. The data collected by the telematics device can be stored and/or analyzed within the telematics device. Additionally or alternatively, the telematics device can transmit, via a wired or wireless transmission network, the data to one or more computing devices for storage and/or analysis. In a variety of implementations, the telematics device transmits data indicating a route the vehicle or driver has traveled, including multiple points along the route of travel. As explained in more detail below, the location points of the route may include a latitude value, a longitude value, and a sequence value. Other location services and systems may provide alternative or additional information to locate the vehicle or driver along a route or "trip".

Vehicle 130 can further include a short-range communication system. The short-range communication systems can be a vehicle-based data transmission systems configured to transmit vehicle operational data to other nearby vehicles, and to receive vehicle operational data from other nearby vehicles. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system need not use DSRC, and can be implemented using other short-range wireless protocols in other examples, such as WLAN communication protocols (e.g., IEEE 802.11), BLUETOOTH (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, BLUETOOTH, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, railroad crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to one or more computing devices.

The types of vehicle operational data, vehicle driving data, breakdown issue data, or the like, transmitted to or from vehicle 130 and/or infrastructure can depend on the protocols and standards used for the V2V or V2I communication, the range of communications, and other factors. In certain examples, vehicle 130 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system. Collected data may be from on-board or mobile telematics data, and in some cases, may be uploaded using any suitable wireless communication network. In some implementations, the collected data may be obtained from any suitable sensors that may be part of, or separate from the vehicle. For example, data may be collected from cameras or in-road sensors that may be within the vicinity of the vehicle.

The data transferred to and from various devices in operating environment 100 can include secure and sensitive data. Therefore, it can be desirable to protect transmissions of such data using secure network protocols and encryption and to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many implementations, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices describe herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
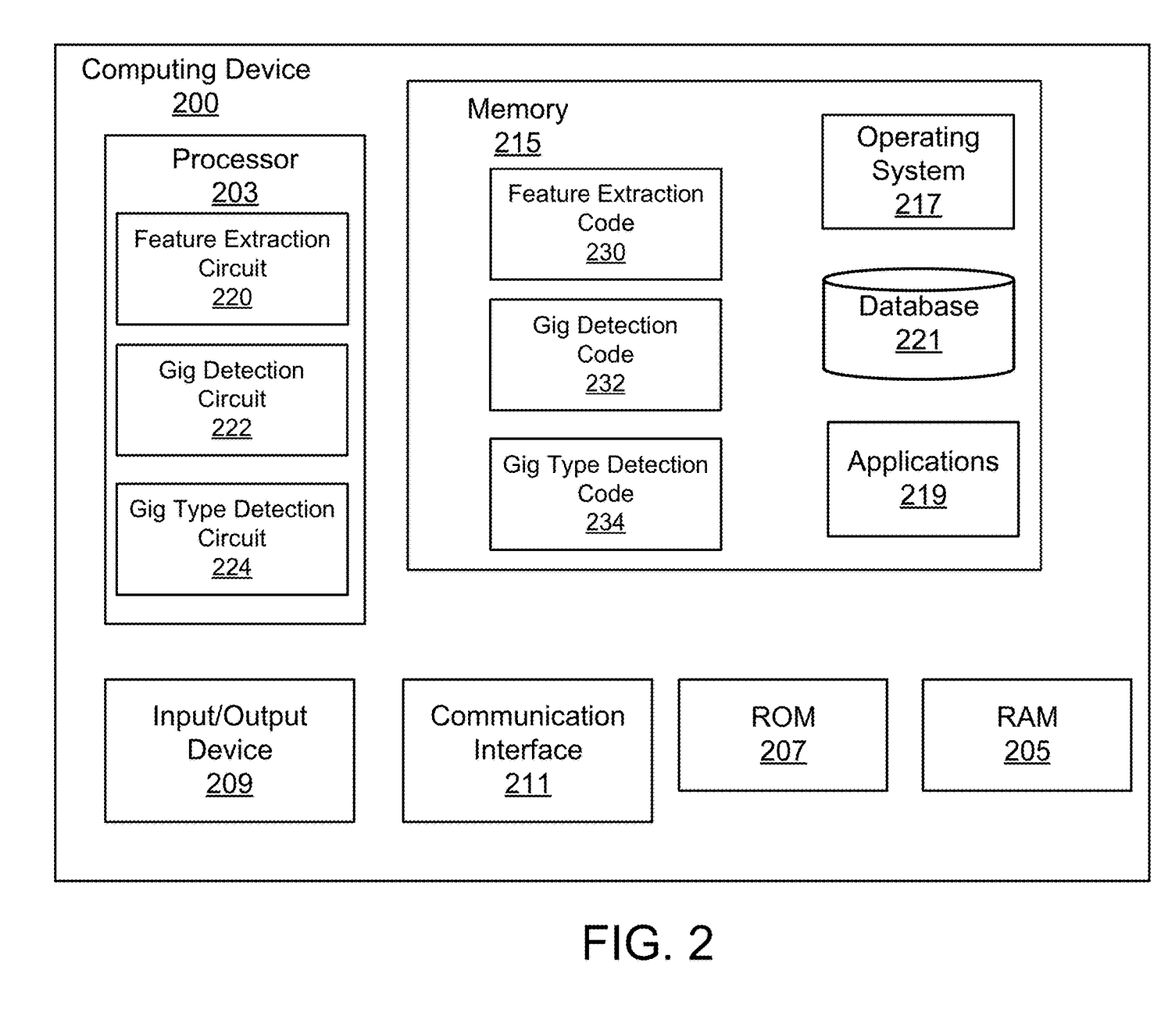
FIG. 2 illustrates an example computing device that may be used for gig driving detection from telematics data.

FIG. 2 illustrates an example computing device 200, in accordance with certain aspects of the present disclosure. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, optical sensor, and/or stylus through which a user of the computing device 200 can provide input and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable, and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For implementations including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various implementations and can provide potential advantages in certain implementations of software deployment systems, such as faster response times and less dependence on network conditions when transmitting and receiving data.

In some aspects, the processor 203 may include circuit 220 for extracting features (e.g., generating input features), circuit 222 for gig detection (e.g., detecting whether a trip is associated with gig driving or personal driving), and circuit 224 for gig type detection (e.g., determining a type of gig associated with a trip). The memory 215 may store code which, when executed by the processor 203, performs the operations described herein. For example, the memory 215 may include code 230 for extracting features (e.g., generating input features), code 232 for gig detection (e.g., detecting whether a trip is associated with gig driving or personal driving), and code 234 for gig type detection (e.g., determining a type of gig associated with a trip). Although various components of computing device 200 are described separately, functionality of the various components can be combined and/or performed by a single component and/or multiple computing devices in communication.

Figure 3:
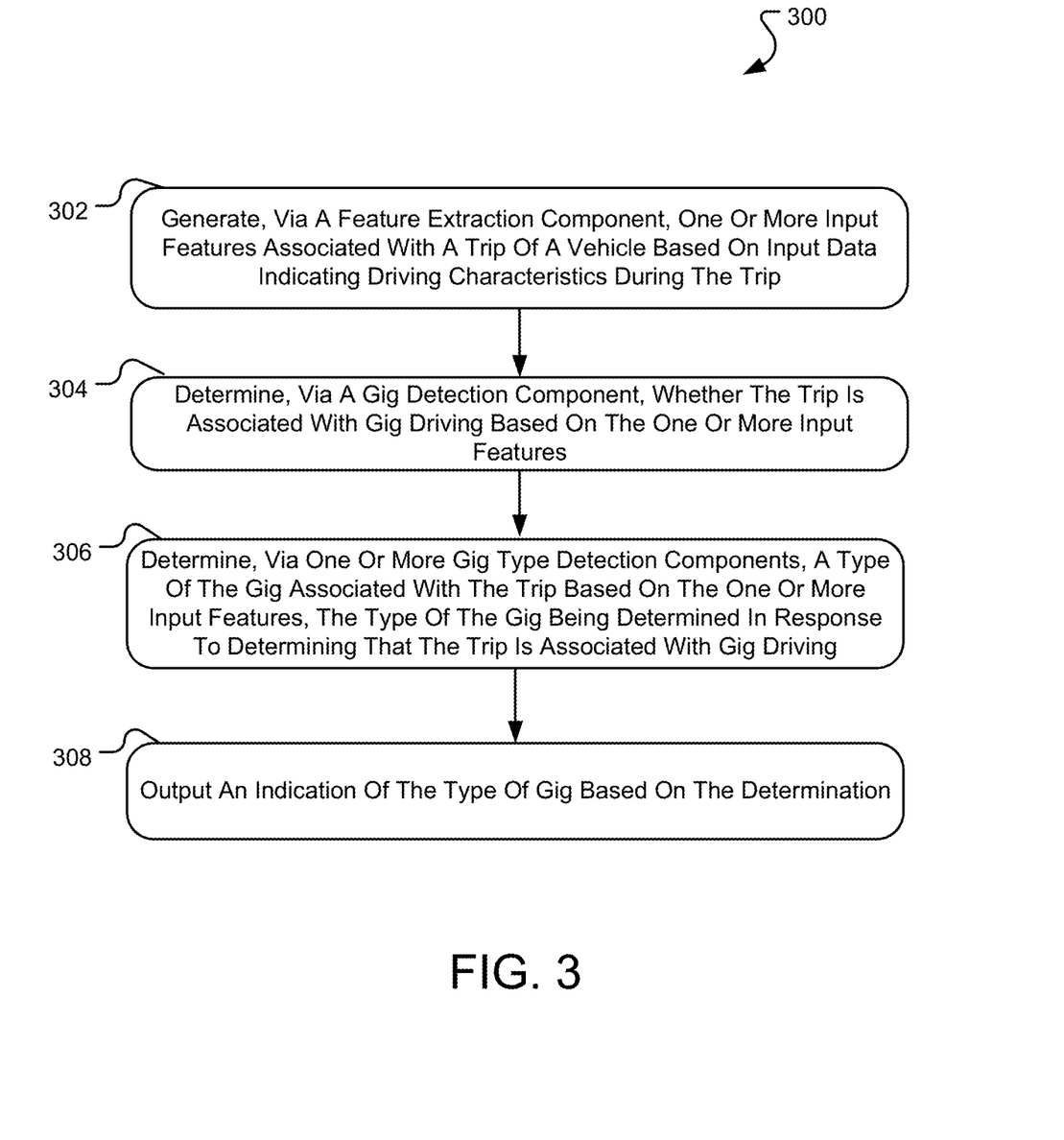
FIG. 3 is a flowchart illustrating an example method for gig driving detection.

FIG. 3 is a flow diagram illustrating example operations 300 for trip classification, in accordance with certain aspects of the present disclosure. The operations 300 may be performed for example, by a classification system, such as the processor 203, and in some aspects, the memory 215.

At block 302, the classification system may generate, via a feature extraction component (e.g., circuit 220 for extracting features), one or more input features associated with a trip of a vehicle based on input data indicating driving characteristics during the trip. The input features may include features associated with the trip as a whole (e.g., duration of the trip), or features associated with segments of the trip (e.g., mean or maximum speed associated with a segment of the trip).

At block 304, the classification system may determine, via a gig detection component (e.g., circuit 222 for gig detection), whether the trip is associated with gig driving based on the one or more input features. For example, the classification system may determine whether the trip is associated with gig driving or personal driving.

At block 306, the classification system may determine, via one or more gig type detection components (e.g., used to implement circuit 224 for gig type detection), a type of the gig associated with the trip based on the one or more input features, the type of the gig being determined in response to determining that the trip is associated with gig driving. In some aspects, at bock 308, the classification system outputs an indication of the type of gig based on the determination.

Figure 4:
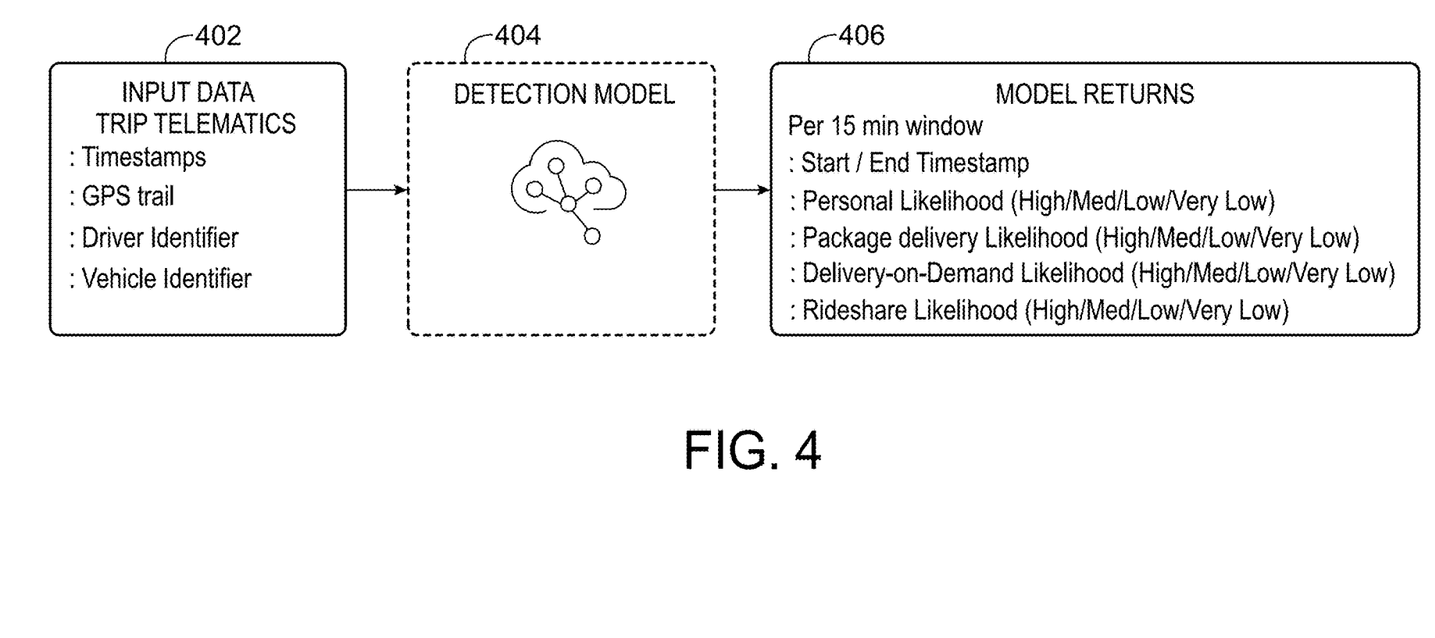
FIG. 4 illustrates inputs and outputs of a detection model, in accordance with certain aspects of the present disclosure.

FIG. 4 illustrates inputs and outputs of a detection model 404 (e.g., used to implement the circuit 222 for gig detection and/or circuit 224 for gig type detection), in accordance with certain aspects of the present disclosure. As shown, the detection model may receive input data 402. The input data 402 may include a movement trail (e.g., a GPS trail) and time stamps associated with the vehicle's trip. For example, the input data 402 may include vehicle locations at different times during the trip and the associated timestamp associated with each location. The vehicle location may be sensed and provided at a specific frequency. For example, locations may be provided for each 1-second increment of the trip, although the time increment may be shorter or longer in some cases. For instance, location information may be provided for every one-minute increment of the trip. The input data 402 may also include, in some aspects, a vehicle identifier and/or driver identifier.

The detection model 404 may process the input data 402 and provide one or more outputs 406. The input data 402 may be received from sensors on a vehicle (e.g., telematics data from a vehicle) or from a mobile device of a driver of the vehicle (or from both the vehicle and the mobile device). The one or more outputs 406 may include an indication of whether the trip is associated with personal driving or gig driving, and in some aspects, an indication of the type of gig driving (e.g., package delivery, delivery-on-demand, or rideshare), as described herein. For example, the detection model may provide a likelihood that the trip is associated with personal driving, a likelihood that the trip is associated with package delivery, a likelihood that the trip is associated with delivery-on-demand, and a likelihood that the trip is associated with rideshare. The likelihood may be a specific percentage or may be one of multiple likelihood levels such as very low, low, medium, or high.

Figure 5:
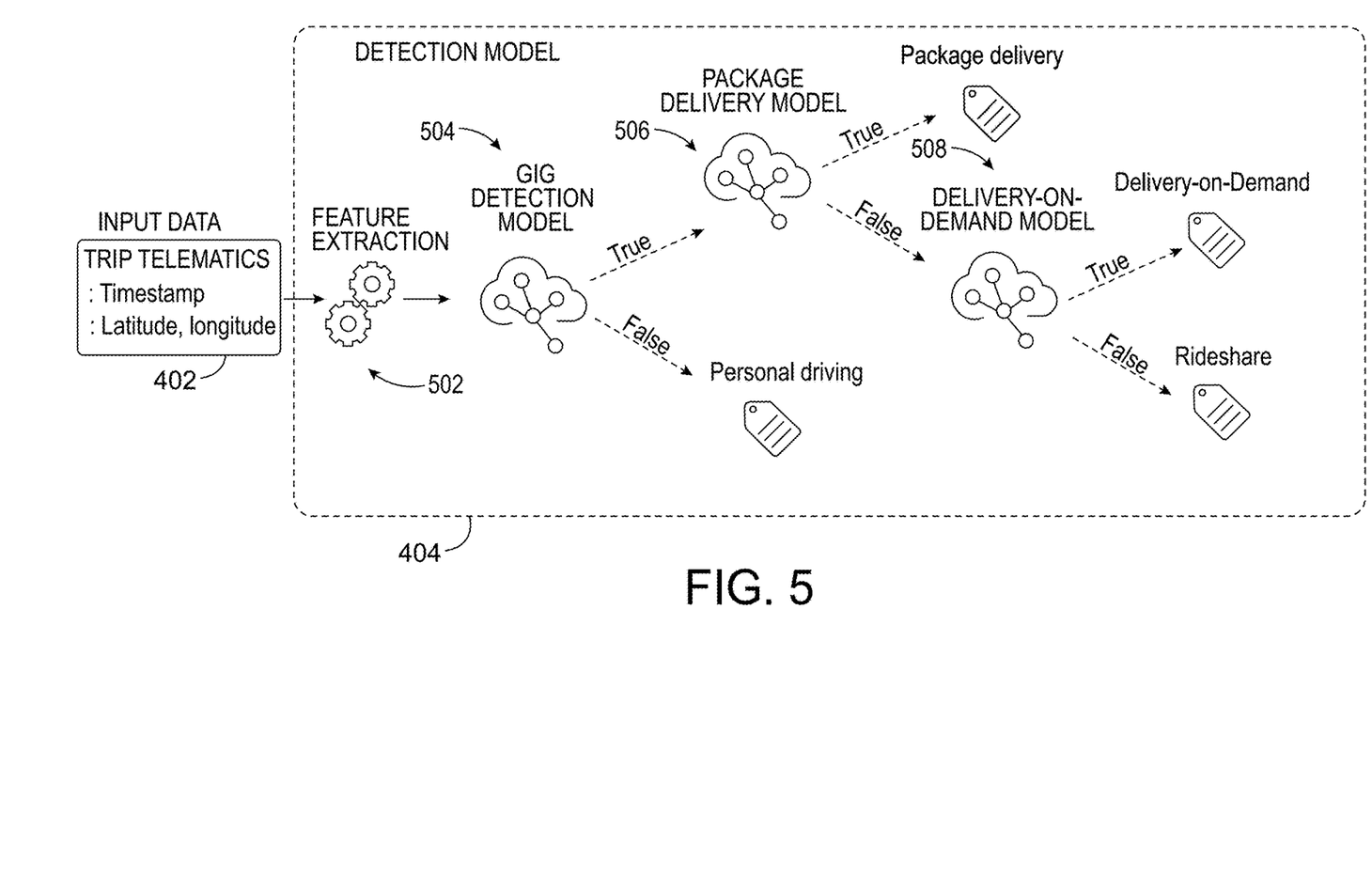
FIG. 5 illustrates operations associated with a detection model, in accordance with certain aspects of the present disclosure.

FIG. 5 illustrates operations associated with the detection model 404, in accordance with certain aspects of the present disclosure. As shown, the detection model 404 may include a feature extraction component 502 (e.g., associated with the circuit 220 for feature extraction). The feature extraction component 502 may receive the input data 402 (e.g., timestamps and location data such as latitudinal and longitudinal coordinates). The feature extraction component 502 may extract trip features, trip segment features, or both, based on the input data 402.

Trip features refer to features associated with the trip as whole, such as the duration of the trip, durations of stops before and after the trip, and the time of day related to the trip. With regards to the trip segment features, a particular trip may be segmented into multiple time segments (e.g., 15-minute segments), and for each time segment, various features may be calculated. These features may include, for example, mean and maximum speed during the trip segment, path and line distances, a quantity of turns during the trip segment, a fraction of the segment during which the vehicle is stopped, or a number of stops during the segment. The various trip segment features are described in more detail herein.

Based on the trip features and/or trip segment features, a gig detection component 504 (e.g., implementing a gig detection model and corresponding to gig detection circuit 222) may detect whether the particular trip is associated with personal driving or gig driving. If the trip is detected to be associated with gig driving, then based on the extracted features, a package delivery component 506 (e.g., implementing a package delivery model) may detect whether the trip is associated with package delivery. If not, a delivery-on-demand component 508 (e.g., a delivery-on-demand model) may determine whether the trip is associated with delivery-on-demand. If not associated with delivery-on-demand, the trip will be categorized as being associated with rideshare, as shown. While FIG. 5 shows a specific order of operation to facilitate understanding, any suitable order of operation may be used. For example, the delivery-on-demand model may be used to determine whether the trip is associated with delivery-on-demand prior to the package delivery model determining whether the trip is associated with package delivery. In some aspects, a rideshare model (not shown) may be used to determine, based on the extracted features, whether the trip is associated with rideshare. The package delivery component 506 and the delivery-on-demand component 508 may correspond to the circuit 224 for gig type detection.

Figure 6:
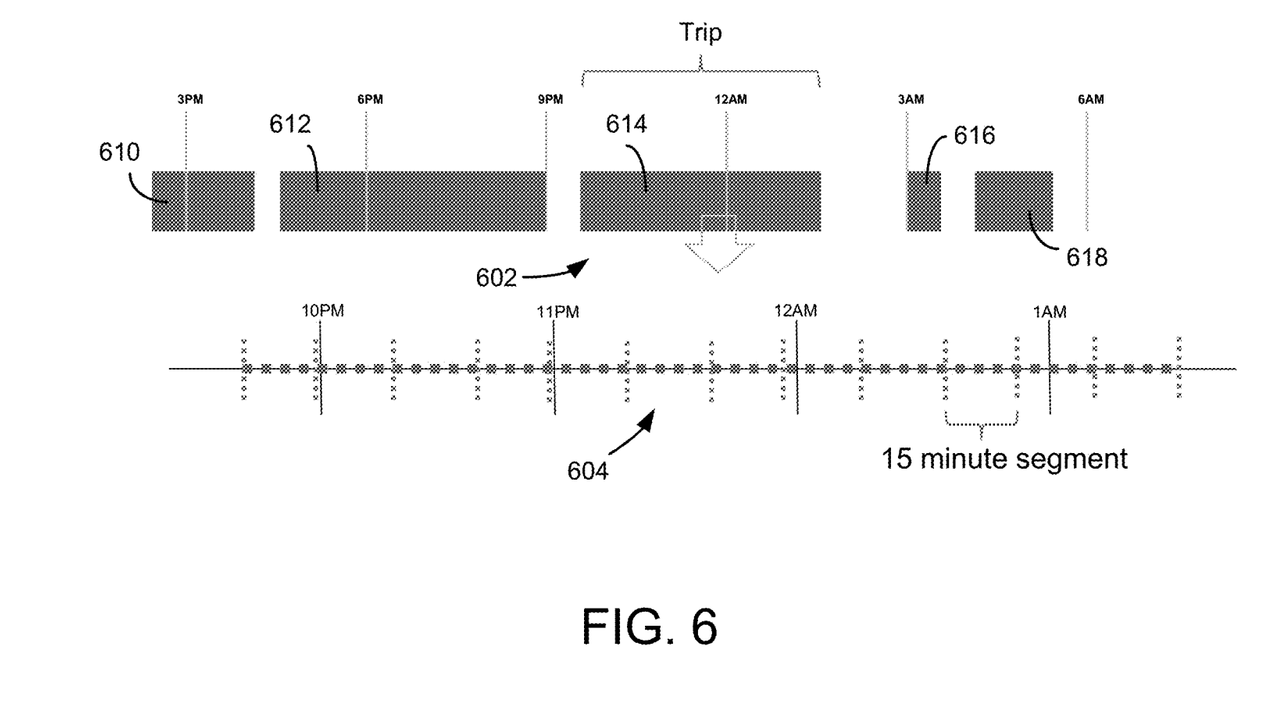
FIG. 6 illustrates trip identification and trip segmentations procedures, in accordance with certain aspects of the present disclosure.

FIG. 6 illustrates trip identification and trip segmentations procedures, in accordance with certain aspects of the present disclosure. As shown, during a particular day, a vehicle may be moving and stopped at different times. Blocks 610, 612, 614, 616, and 618 represent times during which a vehicle is moving. A day of driving may be split into multiple trips based on stops greater than a time threshold (e.g., 10 minutes). For example, any particular trip begins with a stop greater than 10 minutes and ends with a stop greater than 10 minutes. As shown, the vehicle may be stopped from 9 pm till 9:30 pm (e.g., greater than 10 minutes) and stopped from 1:30 am till 3 am (e.g., another stop greater than 10 minutes). Therefore, the movement event between 9:30 pm and 1:30 am may be classified as a trip 602. During a particular day, multiple trips may occur, as shown. While in the examples provided herein a stop of greater than 10 minutes is used to segregate a day of driving into trips, any suitable stop duration may be used. For example, a stop of greater than 15 minutes may be used to classify a trip. Generally, the stop duration for ending a trip and starting a subsequent trip may be selected to be long enough so that traffic stops (e.g., at red lights or stopped in traffic) are not likely to trigger classification of a new trip, but short enough to distinguish trips when the driver makes a purposeful stop (e.g., for a particular errand or at the end of a particular gig driving session). In some cases, a pattern associated with an aggregate of trips may indicate that the driver is engaging in gig driving. For instance, duration of stops between trips or a driving behavior during multiple trips may be considered when determining whether the trips are associated with gig driving. Thus, for instance, if a driver only picks up takeaway from a restaurant, this may not result in a trip being classified as a gig driving trip since the driver only made a single trip to pickup takeaway (e.g., likely for personal consumption). Yet if multiple trips for picking up takeaway are identified, this may be indicative that the driver is engaging in gig driving for food delivery. In some cases, within a trip, there may be multiple stops that are shorter than the time threshold (e.g., 10 minutes) used to classify a new trip. The pattern of the stops in a particular trip may indicate whether the trip is for gig driving or personal driving. In other words, the signature that indicates that a trip is associated with gig driving may be identified by an aggregate of stops and the durations between stops during the trip.

In some aspects of the present disclosure, once the trips are identified, each trip may be segmented into multiple time segments. For example, trip 602 may be segmented into 15-minute segments (e.g., segment 604). Various trip segment features may be calculated for each of the trip segments based on the input data, as described. Based on the trip segment features, the detection model 404 determines whether the particular trip is associated with personal driving or gig driving, and in some aspects, the type of gig driving, as described herein. In some aspects, the detection by the detection model 404 may be further based on trip level features extracted based on the input data. For example, the trip level features may include time of day, duration of trip, duration of previous stop (e.g., the duration of stop immediately before the trip starts), and during of next stop (e.g., the duration of stop immediately after the trip ends). The trip segment level features may include mean and max speed during the trip segment, the path distance of the trip segment, the line distance of the trip segment, a count (e.g., quantity) of direction reversals (e.g., 180° turns) during the trip segment, a count (e.g., quantity) of 90° turns during the trip segment, fraction of segment during which the vehicle is not moving (e.g., not moving for less than 10 minutes), and a quantity of stops between 0 and 10 minutes in 30 second increments. For example, the quantity of stops in 30 second increments may include a number of stops from time 0 to 30 seconds, the number of stops from 30 seconds to 1 minute, a number of stops from 1 minute to 1 minute 30 seconds, and so on till the end of the trip segment. While 30 seconds is used as one example, other suitable time periods may be used (e.g., 20 seconds or 40 seconds).

By using trip segment features, more information with regards to the trip may be extracted and considered by the detection model 404. For example, during a first segment of a trip, a driver performing package delivery may travel at high speeds headed towards a particular neighborhood to perform package delivery, and during a second segment of the trip, the driver may have already arrived at a neighborhood, making stops and driving at low speeds. If only trip level features were used, the intricacies specific to each time segment of the trip may not be adequately captured. For example, an extracted feature such as maximum speed would not capture the relatively low speed associated with the second segment of the trip as compared to the first segment of the trip if the feature was only calculated for the trip as a whole. Thus, by segmenting trips into multiple time increments and extracting features for each segment separately, more detailed information is extracted and fed to the detection model 404 for processing.

While various example features have been described to facilitate understanding, any suitable vehicle parameter may be used for the classification of trips as described herein. For example, in some aspects, data indicating door or trunk opening and closing during a particular trip may be used for classifying whether the trip is associated with gig driving and the type of gig driving. This data may be obtained using door sensors on the vehicle, or accelerometer data indicating that a door has been opened or closed.

Figure 7:
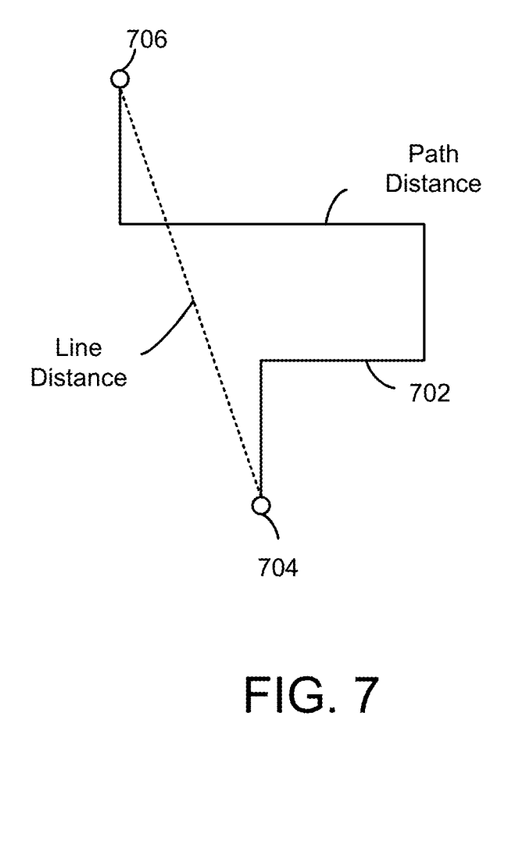
FIG. 7 illustrates techniques for calculating a path distance and line distance for a trip segment, in accordance with certain aspects of the present disclosure.

FIG. 7 illustrates techniques for calculating a path distance and line distance for a trip segment, in accordance with certain aspects of the present disclosure. As shown, a vehicle may travel along a path 702 from a starting point 704 to an ending point 706 during a trip segment. For the trip segment, a path distance may be calculated as being a total distance traveled by the vehicle along the path 702, and a line distance may be calculated as being a straight-line distance from the starting point 704 to the ending point 706, as shown.

The various features extracted are used by the detection model to categorize each trip as either personal driving or gig driving and even provide the type of gig driving, in some aspects. For example, the duration of the trip may facilitate the detection model to distinguish between personal driving and gig driving since driving for a gig may be associated with longer trips as compared to personal driving. As another example, the duration of the stop before or after a particular trip may be longer for personal driving as compared to gig driving, allowing the detection model to distinguish between personal and gig driving. Minimum and maximum speed allow the model to distinguish between highway driving or slow driving through neighborhoods that may be associated with package delivery. A longer path distance as compared to line distance indicates that there was a lot of twists during a particular drive, which may indicate that the driver was delivering packages to different houses (e.g., as opposed to a linear drive which may indicate personal driving or rideshare). A high quantity of direction reversals or 90° turns may indicate that the driver is performing rideshare as drivers engaged in rideshare tend to perform many direction reversals (e.g., to pick up different passengers). Fraction of a segment during which the vehicle is stopped and the number of stops during the segment may capture driving patterns that may be associated with delivery-on-demand and rideshare due to the high number of stops associated with such activities (e.g., for dropping off and picking up passengers, or picking up food and dropping the food off at a location).

In some aspects, the various models described herein may be trained machine learning models. For example, a labeled dataset including vehicle movement trails associated with personal driving and various types of gig driving may be used to train machine learning models to perform the operations described herein.

Figure 8:
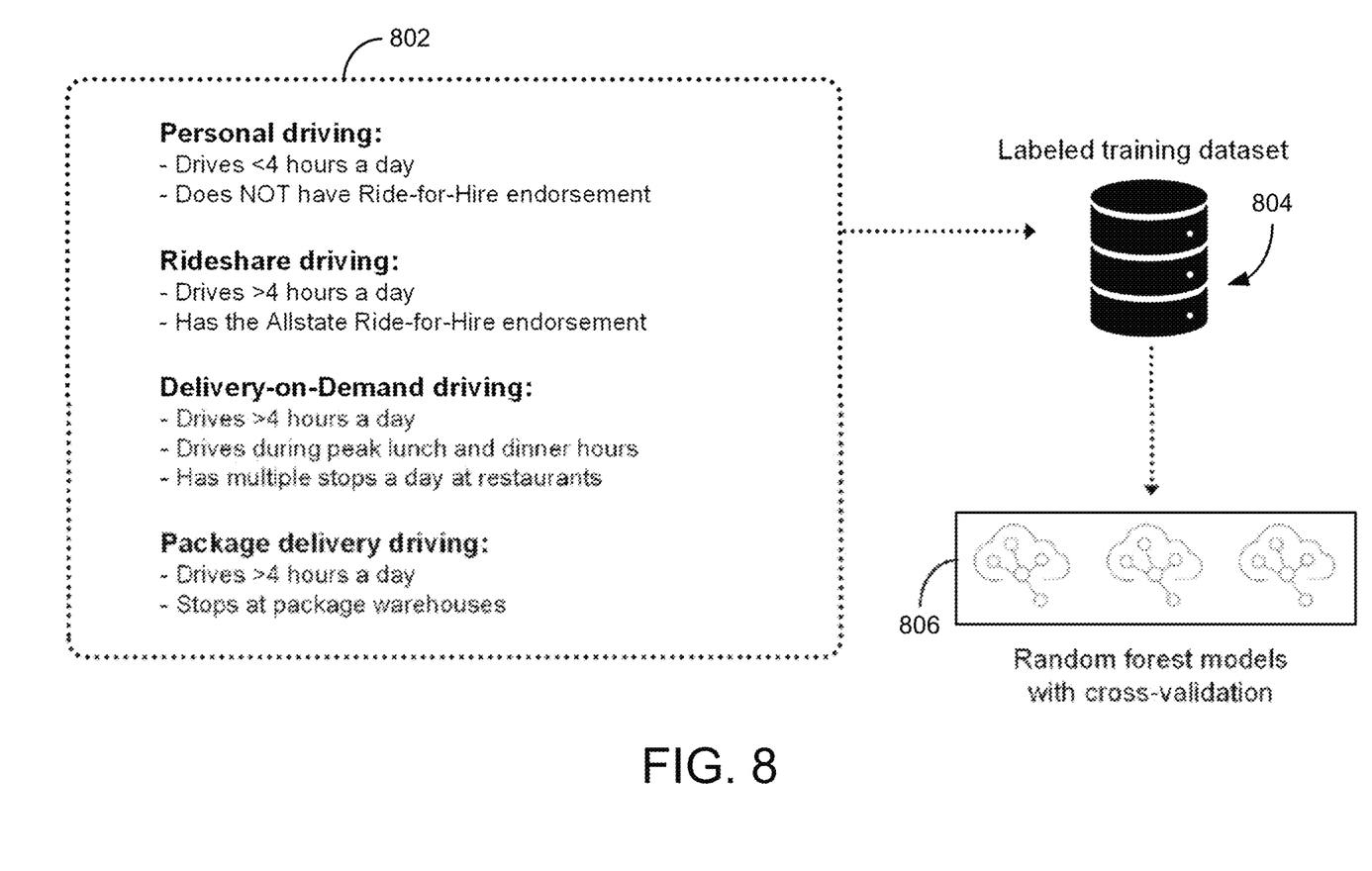
FIG. 8 illustrates example operations for training a machine learning model, in accordance with certain aspects of the present disclosure.

FIG. 8 illustrates example operations for training a machine learning model, such as the detection model 404, in accordance with certain aspects of the present disclosure. As shown, a training dataset 802 may be received and categorized to generate a labeled dataset 804. In other words, datasets may be categorized into either personal driving, rideshare driving, delivery-on-demand driving, or package delivery driving, and labeled accordingly. For example, suppose a dataset indicates driving of less than 4 hours per day and the driver does not have a ride-for-higher endorsement on an insurance plan. In that case, the dataset may be categorized and labeled as a personal driving dataset. As another example, suppose the dataset indicates driving of greater than 4 hours per day, and has a ride-for-higher endorsement. In that case, the dataset may be categorized and labeled as a rideshare driving dataset. As another example, suppose the dataset indicates driving of greater than four hours a day, drives during peak lunch and dinner hours, and has multiple stops at restaurants. In that case, the dataset may be categorized and labeled as a delivery-on-demand driving dataset. If the dataset indicates driving of greater than 4 hours a day and stops at package warehouses (e.g., for pickup of packages for delivery), then the dataset may be categorized as a package delivery driving dataset. The labeled dataset 804 may be used to train a machine learning model 806 used to implement the detection model 404, as described.

In some aspects, the machine learning model may be trained using an objective function. For example, candidate solutions may be provided to the model and evaluated against training datasets. An error score (also referred to as a loss of the model) may be calculated by comparing the solution with the training dataset. The machine learning model may be trained to minimize the error score. For example, the machine learning model may be trained by receiving training data sets such as GPS trail and timestamps associated with various trips of vehicles, and corresponding solutions (e.g., labels) of the training datasets such as whether each training dataset is associated with personal driving, package delivery, delivery-on-demand, or rideshare. Based on the training datasets and labels, the machine learning model may be trained by adjusting model weights.

In some aspects, a random forest model with cross-validation of decision trees may be used to generate the detection model 404. A random forest is a machine learning algorithm that combines the output of multiple decision trees to reach a result. For example, decision trees may be built on different data samples. A majority vote from the decision trees may be used to provide a classification result or an average of outputs from the decision trees may be used to provide a regression result.

Figure 9:
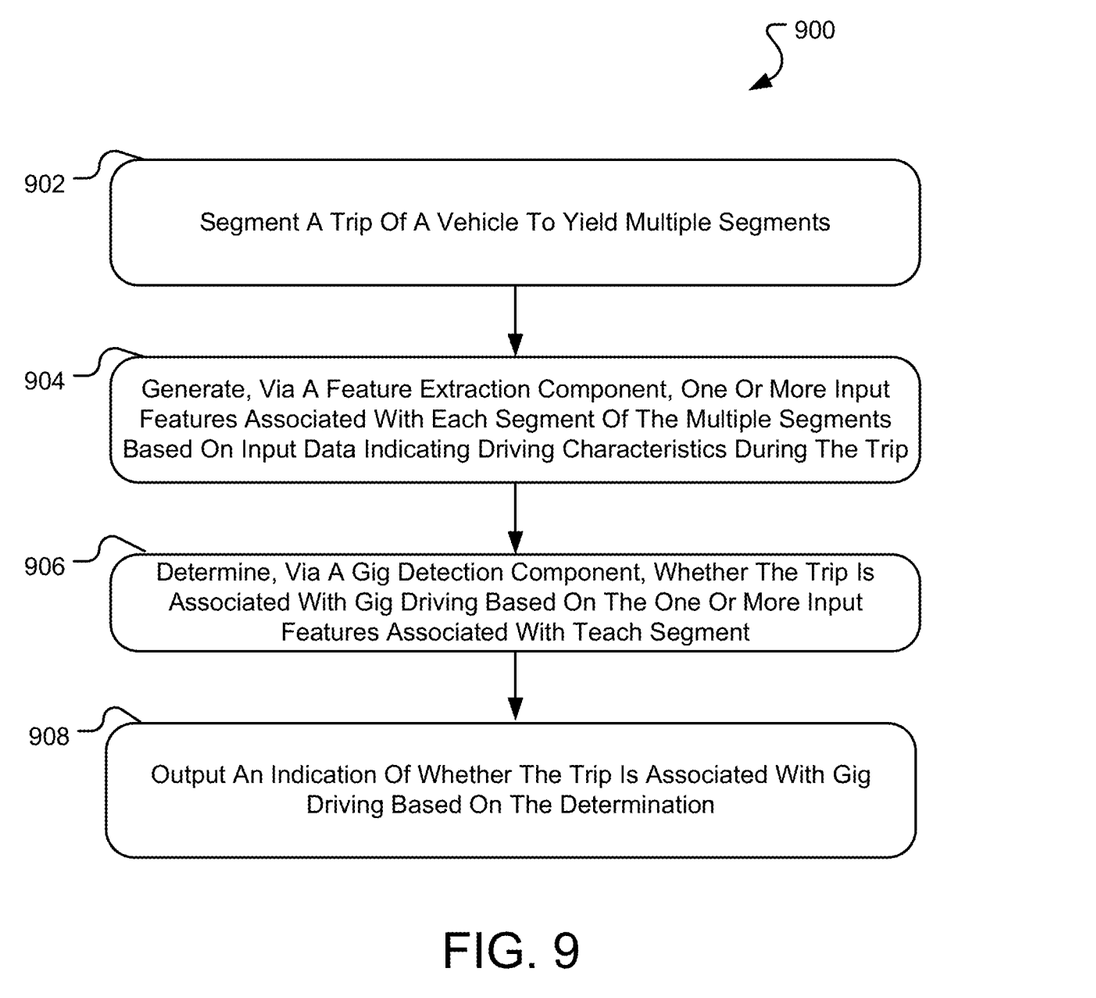
FIG. 9 is a flow diagram illustrating example operations for trip classification, in accordance with certain aspects of the present disclosure.

FIG. 9 is a flow diagram illustrating example operations 900 for trip classification, in accordance with certain aspects of the present disclosure. The operations 900 may be performed for example, by a classification system, such as the processor 203, and in some aspects, the memory 215.

At block 902, the classification system segment a trip of a vehicle to yield multiple segments. At block 904, the classification system generates, via a feature extraction component, one or more input features associated with each segment of multiple segments of a trip of a vehicle based on input data indicating driving characteristics during the trip. The input data may be a movement trail associated with the vehicle during the segment of the trip. For instance, the input data may be locations of the vehicle at different times during the segment of the trip and timestamps associated with the locations.

In some cases, the classification system may extract, from driving data, the input data associated with the trip based on the vehicle being stopped for a duration greater than a first threshold time period prior to the trip and stopped for a duration greater than a second threshold time period after the trip. The first threshold time period may be the same as the second threshold time period (e.g., 10 minutes).

The one or more inputs features associated with the segment may include at least one of a mean speed of the vehicle during the segment of the trip, a maximum speed of the vehicle during the segment of the trip, a path distance associated with the segment of the trip, a straight line distance from a starting location to an ending location associated with the segment of the trip, a quantity of direction reversals during the segment of the trip, a quantity of right or left turns during the segment of the trip, a fraction of the segment during which the vehicle is stopped, and a quantity of stops during the segment of the trip. The quantity of stops may include a quantity of stops during each of multiple subsegments (e.g., 30 second increments) of the segment of the trip.

At block 906, the classification system determines, via a gig detection component, whether the trip is associated with gig driving based on the one or more input features associated with each segment. The gig detection component may implement one or more trained machine learning models, as described. In some aspects, if the trip is associated with gig driving, the classification system may also determine, based on one or more gig type detection components, a type of gig being performed during the trip. The type of gig may include a package delivery gig, a delivery-on-demand gig, or a rideshare gig. Determining the type of gig may include at least one of detecting, via a packet delivery component, whether the trip is associated with package delivery gig, or detecting, via a delivery-on-demand model, whether the trip is associated with delivery-on-demand gig. The one or more gig type detection components may implement trained machine learning models, as described herein. Determining the type of gig may include determining that the type of gig is a rideshare gig if the trip is not associated with the package delivery or the delivery-on-demand gig.

In some case, the classification system may also determine one or more trip level features based on the input data. In this case, determining whether the trip is associated with gig driving may be further based on the trip level features. The trip level features may include at least one of a time of day associated with the trip, a duration of the trip, a duration of a stop prior to the trip, and a duration of a stop after the trip.

At block 908, the classification system outputs an indication of whether the trip is associated with gig driving based on the determination.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an implementation in the present disclosure can be references to the same implementation or any implementation; and, such references mean at least one of the implementations.

Reference to "one implementation" or "an implementation" means that a particular feature, structure, or characteristic described in connection with the implementation is included in at least one implementation of the disclosure. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various implementations given in this specification.

Without intent to limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

We claim:

1. A method for trip classification, comprising:
   segmenting, by a classification server comprising one or more processors, a trip of a vehicle to yield multiple segments;
   generating, by the classification server, one or more input features associated with each segment of the multiple segments based on input data indicating driving characteristics during the trip;
   determining, by the classification server, that the trip is associated with gig driving based on the one or more input features associated with each segment;
   following the determination that the trip is associated with gig driving, determining, by the classification server and based on the one or more input features associated with each segment, a type of gig being performed during the trip, wherein the type of gig that is determined is selected from a group consisting of a package delivery gig, an on-demand food delivery gig, and a rideshare gig; and
   following the determination of the type of gig being performed during the trip, outputting, by the classification server, an identification of the type of gig being performed during the trip;
   wherein determining, by the classification server and based on the one or more input features associated with each segment, the type of gig being performed during the trip comprises:
      determining that the type of gig is not a first one of the package delivery gig, the-on-demand food delivery gig, or the rideshare gig;
      following the determination that the type of gig is not the first one of the package delivery gig, the on-demand food delivery gig, or the rideshare gig, determining that the type of gig is not a second one of the package delivery gig, the on-demand food delivery gig, or the rideshare gig; and
      following the determination that the type of gig is not the second one of the package delivery gig, the on-demand food delivery gig, or the rideshare gig, determining that the type of gig is the third one of the package delivery gig, the on-demand food delivery gig, or the rideshare gig.

2. The method of claim 1, further comprising splitting, by the classification server, a time period of driving of the vehicle into multiple trips of the vehicle based on the vehicle being stopped for a duration greater than a first threshold time period prior to each of the multiple trips and stopped for a duration greater than a second threshold time period after each of the multiple trips, wherein the multiple trips comprises the trip of the vehicle.

3. The method of claim 2, wherein the first threshold time period is the same as the second threshold time period.

4. The method of claim 1, wherein the one or more input features associated with the segment includes at least one of:
   a mean speed of the vehicle during the segment of the trip;
   a maximum speed of the vehicle during the segment of the trip;
   a path distance associated with the segment of the trip;
   a straight line distance from a starting location to an ending location associated with the segment of the trip;
   a quantity of direction reversals during the segment of the trip;
   a quantity of right or left turns during the segment of the trip;
   a fraction of the segment during which the vehicle is stopped; and
   a quantity of stops during the segment of the trip.

5. The method of claim 4, wherein the quantity of stops comprises a quantity of stops during each of multiple subsegments of the segment of the trip.

6. The method of claim 1, wherein determining, by the classification server, that the trip is associated with gig driving comprises utilizing, by the classification server, one or more trained machine learning models to determine that the trip is associated with gig driving.

7. The method of claim 1, wherein the input data comprises a movement trail associated with the vehicle during the segment of the trip.

8. The method of claim 1, wherein the input data comprises locations of the vehicle at different times during the segment of the trip and timestamps associated with the locations.

9. The method of claim 1, further comprising determining one or more trip level features based on the input data, wherein determining that the trip is associated with gig driving is further based on the one or more trip level features.

10. The method of claim 9, wherein the one or more trip level features include at least one of:
    a time of day associated with the trip;
    a duration of the trip;
    a duration of a stop prior to the trip; and
    a duration of a stop after the trip.

11. The method of claim 1, wherein determining, by the classification server, the type of gig being performed during the trip comprises utilizing, by the classification server, one or more trained machine learning models to determine the type of gig being performed during the trip.

12. The method of claim 1, wherein outputting, by the classification server, the identification of the type of gig being performed during the trip comprises outputting, by the classification server, both the identification of the type of gig being performed during the trip and a likelihood that the identification of the type of gig being performed during the trip is correct.

13. A method for trip classification, comprising:
    generating, by a classification server comprising one or more processors, one or more input features associated with a trip of a vehicle based on input data indicating driving characteristics during the trip;
    determining, by the classification server, that the trip is associated with gig driving based on the one or more input features;
    following the determination that the trip is associated with gig driving, determining, by the classification server and based on the one or more input features, a type of gig being performed during the trip, wherein the type of gig that is determined is selected from a group consisting of a package delivery gig, an on-demand food delivery gig, and a rideshare gig; and
    following the determination of the type of gig being performed during the trip, outputting, by the classification server, an identification of the type of gig being performed during the trip;
    wherein determining, by the classification server and based on the one or more input features, the type of gig being performed during the trip comprises:
       determining that the type of gig is not a first one of the package delivery gig, the-on-demand food delivery gig, or the rideshare gig;
       following the determination that the type of gig is not the first one of the package delivery gig, the on-demand food delivery gig, or the rideshare gig, determining that the type of gig is not a second one of the package delivery gig, the on-demand food delivery gig, or the rideshare gig; and following the determination that the type of gig is not the second one of the package delivery gig, the on-demand food delivery gig, or the rideshare gig, determining that the type of gig is the third one of the package delivery gig, the on-demand food delivery gig, or the rideshare gig.

14. The method of claim 13, wherein:

determining, by the classification server, that the trip is associated with gig driving comprises utilizing, by the classification server, one or more machine learning models to determine that the trip is associated with gig driving; and determining, by the classification server, the type of gig being performed during the trip comprises utilizing, by the classification server, the one or more machine learning models to determine the type of gig being performed during the trip.

15. The method of claim 13, further comprising splitting, by the classification server, a time period of driving of the vehicle into multiple trips of the vehicle based on the vehicle being stopped for a duration greater than a first threshold time period prior to each of the multiple trips and stopped for a duration greater than a second threshold time period after each of the multiple trips, wherein the multiple trips comprises the trip of the vehicle.

16. A non-transitory, computer-readable medium storing instructions that, when executed by one or more processors, cause the one or more processors to:

segment a trip of a vehicle to yield multiple segments;

generate one or more input features associated with each segment of multiple segments of a trip of a vehicle based on input data indicating driving characteristics during the trip;

determine that the trip is associated with gig driving based on the one or more input features associated with each segment;

following the determination that the trip is associated with gig driving, determine, based on the one or more input features associated with each segment, a type of gig being performed during the trip, wherein the type of gig that is determined is selected from a group consisting of a package delivery gig, an on-demand food delivery gig, and a rideshare gig; and following the determination of the type of gig being performed during the trip, output an identification of the type of gig being performed during the trip;

wherein, to determine the type of gig being performed during the trip, the instructions, when executed by the one or more processors, further cause the one or more processors to:

determine that the type of gig is not a first one of the package delivery gig, the-on-demand food delivery gig, or the rideshare gig;

following the determination that the type of gig is not the first one of the package delivery gig, the on-demand food delivery gig, or the rideshare gig, determine that the type of gig is not a second one of the package delivery gig, the on-demand food delivery gig, or the rideshare gig; and following the determination that the type of gig is not the second one of the package delivery gig, the on-demand food delivery gig, or the rideshare gig, determine that the type of gig is the third one of the package delivery gig, the on-demand food delivery gig, or the rideshare gig.

* * * * *